(12) United States Patent
Hetmaniok

(10) Patent No.: US 11,168,781 B2
(45) Date of Patent: Nov. 9, 2021

(54) LUBRICANT FEED IN A VERTICALLY MOUNTED GEARBOX

(71) Applicant: ZF Friedrichshafen AG, Friedrichshafen (DE)

(72) Inventor: Simon Hetmaniok, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/020,845

(22) Filed: Sep. 15, 2020

(65) Prior Publication Data

US 2021/0079996 A1 Mar. 18, 2021

(30) Foreign Application Priority Data

Sep. 17, 2019 (DE) .................... 10 2019 214 105.6

(51) Int. Cl.
*F16H 57/04* (2010.01)
*F16H 57/08* (2006.01)

(52) U.S. Cl.
CPC ..... *F16H 57/0427* (2013.01); *F16H 57/0479* (2013.01); *F16H 57/0482* (2013.01)

(58) Field of Classification Search
CPC ............ F16H 57/0427; F16H 57/0479; F16H 57/0482
See application file for complete search history.

(56) References Cited

U.S. PATENT DOCUMENTS

| | | | | |
|---|---|---|---|---|
| 7,214,157 | B2* | 5/2007 | Flamang | F16H 57/043 475/159 |
| 10,975,952 | B2* | 4/2021 | Simon | F16H 1/2863 |
| 10,975,955 | B2* | 4/2021 | Devreese | F16H 57/082 |
| 2009/0029820 | A1* | 1/2009 | Nishida | F16D 25/123 475/159 |
| 2009/0247348 | A1* | 10/2009 | Haupt | F16H 57/0479 475/159 |
| 2016/0265651 | A1 | 9/2016 | Warren | |

FOREIGN PATENT DOCUMENTS

| | | |
|---|---|---|
| CN | 201277153 Y | 7/2009 |
| DE | 102013222847 A1 | 5/2015 |
| DE | 102015223092 A1 | 5/2017 |
| DE | 102015223232 A1 | 5/2017 |
| DE | 102015223554 A1 | 6/2017 |
| EP | 1488139 A1 | 12/2004 |

* cited by examiner

*Primary Examiner* — Tinh Dang
(74) *Attorney, Agent, or Firm* — Leydig, Voit & Mayer, Ltd.

(57) ABSTRACT

An arrangement includes a structure fixed to a housing, a bearing, and a planet carrier rotatably supported in the structure fixed to the housing via the bearing and an oil feedthrough ring. The oil feedthrough ring forms a lubricant-conducting connection between the structure fixed to the housing and the planet carrier. The structure fixed to the housing, the oil feedthrough ring, the bearing and the planet carrier together form a first cavity. The planet carrier forms at least one lubricant line which opens into the first cavity.

6 Claims, 1 Drawing Sheet

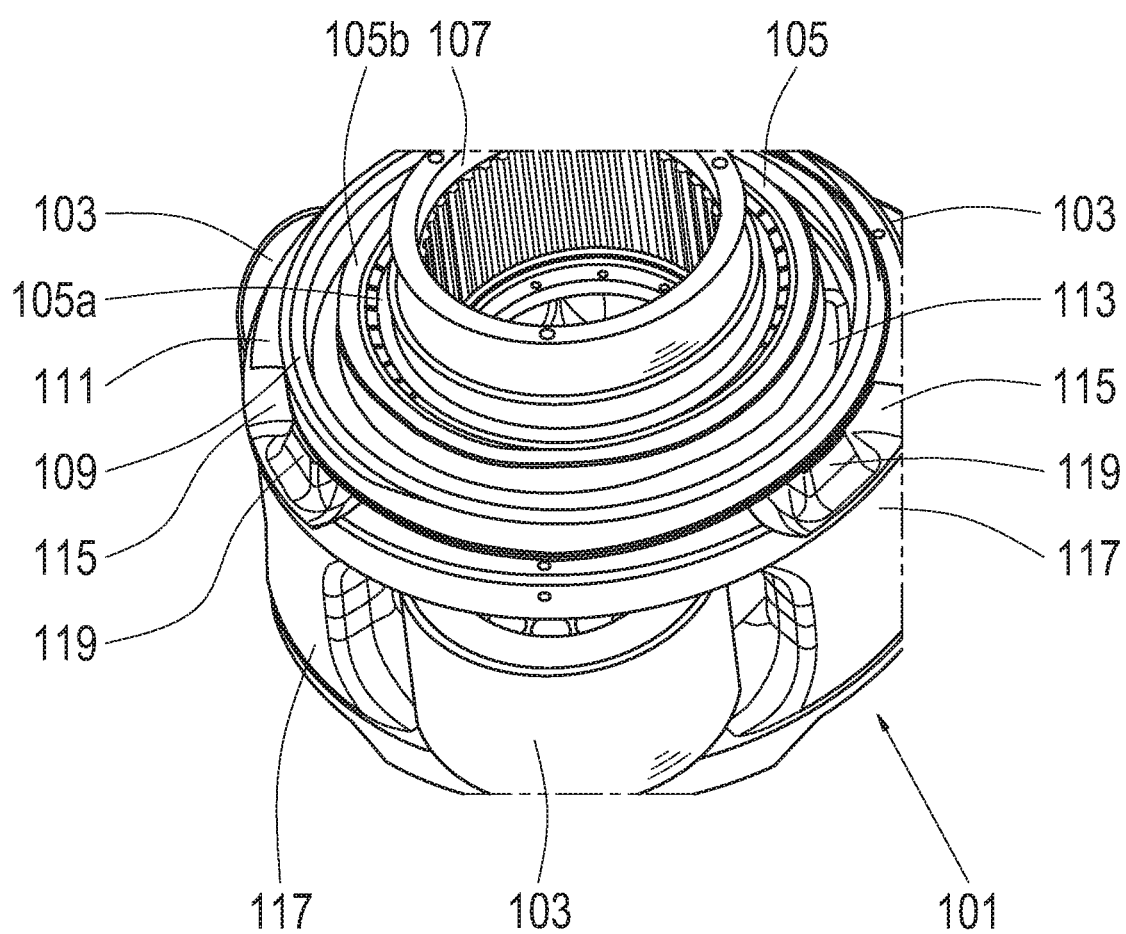

LUBRICANT FEED IN A VERTICALLY MOUNTED GEARBOX

CROSS REFERENCE TO RELATED APPLICATIONS

This application claims benefit to German Patent Application No. DE 10 2019 214 105.6, filed on Sep. 17, 2019, the entire disclosure of which is hereby incorporated by reference herein.

FIELD

The invention relates to an arrangement for rotatably supporting a planet carrier.

BACKGROUND

A U-shaped oil feedthrough ring is known from EP 1 488 139 A1. The oil feedthrough ring serves to transfer oil from a structure fixed to the housing to a rotatably mounted planet carrier. The oil feedthrough ring is fixed to the planet carrier and engages in a groove fixed to the housing. This creates a cavity formed by the structure fixed to the housing, the oil feedthrough ring, a bearing of the planet carrier and the planet carrier itself. This is problematic when the planet carrier is mounted with its axis of rotation arranged vertically. The oil for lubricating the bearing then collects in the cavity and cannot drain off.

SUMMARY

In an embodiment, the present invention provides an arrangement. The arrangement includes a structure fixed to a housing, a bearing, and a planet carrier rotatably supported in the structure fixed to the housing via the bearing and an oil feedthrough ring. The oil feedthrough ring forms a lubricant-conducting connection between the structure fixed to the housing and the planet carrier. The structure fixed to the housing, the oil feedthrough ring, the bearing and the planet carrier together form a first cavity. The planet carrier forms at least one lubricant line which opens into the first cavity.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE depicts a planet carrier according to an embodiment;

DETAILED DESCRIPTION

The present disclosure provides an oil feedthrough that eliminates disadvantages inherent in solutions known from the prior art. In particular, oil feedthroughs provided by the present disclosure are intended to make possible transfer of oil from a structure fixed to the housing to a rotatably mounted planet carrier with a vertical axis of rotation.

An arrangement according to the present disclosure comprises a structure fixed to the housing, a bearing, a planet carrier and an oil feedthrough ring. The planet carrier is rotatably supported in the structure fixed to the housing by means of the bearing. The structure fixed to the housing is characterized in that it is fixed in a gearbox housing in a rotationally fixed manner, preferably rigidly, i.e. without the possibility of relative movement. In particular, the structure fixed to the housing can be the gearbox housing itself.

The planet carrier is preferably part of a planetary stage which additionally comprises a ring gear, a sun gear and at least one planet gear. The planet gear is rotatably mounted in the planet carrier and interlocks with the ring gear and/or the sun gear. Such a planetary stage is used, for example, in gearboxes for wind turbines or cable cars.

In order to supply lubricant to a bearing by which the planet gear is mounted in the planet carrier, lubricant must be introduced into the planet carrier from the structure fixed to the housing. The oil feedthrough ring serves this purpose.

An oil feedthrough ring is a means for directing lubricant between two components which are rotatable relative to each other, specifically between an opening of a lubricant line of a first component and an opening of a lubricant line of a second component. The opening of the lubricant line of the first component and the opening of the lubricant line of the second component are arranged off-center, i.e. their geometric center lies in each case outside the axis of rotation of the first component and the second component relative to one another. In particular, the openings are not rotationally symmetrical with respect to the axis of rotation.

The oil feedthrough ring is coaxial with an axis of rotation of the planet carrier. A central axis of the oil feedthrough ring is identical to the axis of rotation of the planet carrier. The oil feedthrough ring preferably runs rotationally symmetrically with respect to the axis of rotation of the planet carrier and circumferentially surrounds an input shaft which is non-rotatably connected to the planet carrier or a sun shaft which is non-rotatably connected to the sun gear of the planetary stage described above. This means that the input or sun shaft passes through the oil feedthrough ring or through said axially extending cavity in the axial direction. As disclosed in EP 1 488 139 A1, the oil feedthrough ring can be configured as a U-shaped ring.

In the present case, the first component is the structure fixed to the housing and the second component is the planet carrier. Accordingly, the oil feedthrough ring forms a lubricant-conducting connection between the structure fixed to the housing and the planet carrier. The oil feedthrough ring is either fixed to the planet carrier and forms a lubricant-conducting connection with the structure fixed to the housing or is fixed to the structure fixed to the housing and forms a lubricant-conducting connection with the planet carrier.

The structure fixed to the housing, the oil feedthrough ring, the bearing and the planet carrier or a cheek of the planet carrier, i.e. one of two radially extending structures for receiving and fixing planetary pins, together form a first cavity. This means that the first cavity is delimited by the structure fixed to the housing, the oil feedthrough ring, the bearing and the planet carrier or the cheek thereof. The cavity is filled with air and/or lubricant.

In order to prevent lubricant from accumulating in the cavity, the lubricant in the cavity must be drained off, for which purpose, according to the invention, the planet carrier forms, at least one lubricant line which opens into the cavity. Thus, an opening of the lubricant line is directly adjacent to the cavity, so that lubricant can flow from the cavity into the lubricant line via the opening.

The lubricant line forms an outflow for lubricant from the cavity, allowing the arrangement to be vertically aligned. With a vertical alignment of the arrangement, the axis of rotation of the planet carrier runs at least partially vertically, i.e. not horizontally. An angle between the axis of rotation of the planet carrier and a horizontally extending reference axis deviates from 90°. The axis of rotation of the planet carrier preferably extends only vertically. In this case, the axis of rotation of the planet carrier coincides with the vertically running reference axis.

In a preferred further development, the at least one lubricant line has a gradient starting from the opening of the first lubricant line into the first cavity. Starting from the opening into the first cavity, the at least one lubricant line thus has a slope with a negative value. Because of the gradient, the lubricant drains off from the cavity through gravity.

In a further preferred development, the lubricant line opens into a second cavity. The second cavity encloses the planet carrier. This means that the planet carrier is located inside the second cavity. For example, a gearbox housing may form the second cavity. In this case, the inside of the gearbox housing is the second cavity.

Through the opening of the lubricant line into the second cavity, the lubricant is drained off from the first cavity into the second cavity. In particular, the lubricant is thereby conducted out of the planet carrier.

The planet carrier is preferably developed further with at least one recess. The recess is a region of the surface of the planet carrier which is deeper in the direction of the inside of the planet carrier compared to the surrounding surface of the planet carrier. This is therefore an indentation of the surface of the planet carrier. The recess opens into the surrounding region of the surface of the planet carrier with precisely one opening.

In a further development, the oil feedthrough ring spans the recess. The lubricant ring thereby divides the opening of the recess into at least two parts. A first part forms a lubricant-conducting connection with the first cavity, and a second part preferably with the second cavity. Consequently, the recess forms the lubricant line described above.

Such a development is particularly advantageous, since the recess can already be integrated into a blank from which the planet carrier is manufactured. This causes no additional costs in production.

The planet carrier 101 shown in the FIGURE has planet gears 103 which are rotatably supported in the planet carrier 101. The planet carrier 101 itself is rotatably supported by means of a main bearing 105.

An inner ring 105a of the main bearing 105 is fixed on a connecting piece 107 for an input shaft non-rotatably connected to the planet carrier 101. An outer ring 105b of the main bearing 105 is fixed in a gearbox housing, not shown in the FIGURE. This results in a rotatable mounting of the planet carrier 101 in the gearbox housing.

In order to supply lubricant to the bearings with which the planet gears 103 are mounted in the planet carrier 101, the lubricant must be transferred from the gearbox housing to the planet carrier 101. An oil feedthrough ring 109 is provided for this purpose. The oil feedthrough ring 109 is U-shaped in cross-section. It engages in a groove of the gearbox housing, so that the oil feedthrough ring 109 and the groove together form an annular cavity. The cavity serves as a conduit for transferring the lubricant.

The oil feedthrough ring 109 is mounted on an input-side cheek 111 of the planet carrier 101. A further cavity 113 extends between the oil feedthrough ring 109, the gearbox housing, the main bearing 105 and the cheek 111 of the planet carrier 101.

Since one axis of rotation of the planet carrier 101 is vertical, oil for lubricating the main bearing 105 drains off into the cavity 113. In order for the oil not to accumulate in the cavity 113, the planet carrier 101 has recesses 115.

The recesses 115 are located on a radially outer boundary edge of the cheek 111 of the planet carrier 101. They protrude both into the cheek 111 and into a boundary surface 117 on the outer circumference of the planet carrier 101. The oil feedthrough ring 109 extends across the recesses 115. On one side, the recesses open out from the oil feedthrough ring into the cheek 111 of the planet carrier 101, on the other side into the boundary surface 117 or into the cavity 113. The oil can thus flow out of the cavity 113 into the interior of the gearbox housing through the recesses 115.

The recesses 115 each form a plateau 119 in the center. The plateau 119 is a non-recessed region. This region projects out of the recess. The plateaus 119 serve to fix the oil feedthrough ring 109 in place. Thus, the oil feedthrough ring 109 can be bolted to the plateaus 119, for example.

An oil line leads through the plateau 119. This conducts oil from the oil feedthrough ring 109 for injection lubrication of the sun-planet and planet-ring gear tooth engagements. The injection lubrication injects the oil into the tooth engagement in the radial direction with the aid of screwed-in nozzles. These bores are located centrally in regions of the planet carrier that are not stress-critical.

Fastening bores for fixing the oil feedthrough ring 109 in place are introduced on both sides of the oil line passing through the plateau 119. The bores are located centrally in regions of the planet carrier that are not stress-critical.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Planet carrier
103 Planet gear
105 Main bearing

105a Inner ring
105b Outer ring
107 Connecting piece
109 Oil feedthrough ring
111 Cheek
113 Cavity
115 Recess
117 Boundary surface
119 Plateau

What is claimed is:

1. A planet carrier assembly for a planetary stage of a planetary gear system, the planet carrier assembly comprising:
a bearing having an inner ring and an outer ring, the outer ring being configured to be fixed to a housing;
a planet carrier rotatably supported by the bearing, the planet carrier including at least one recess; and
an oil feedthrough ring
wherein the oil feedthrough ring forms a lubricant-conducting connection between the outer ring of the bearing and the planet carrier;
wherein a first cavity is formed, at least in part, by the planet carrier and the oil feedthrough ring; and
wherein the at least one recess of the planet carrier forms at least one lubricant line which opens into the first cavity.

2. The arrangement according to claim 1, wherein the at least one lubricant line has a gradient starting from an opening in the first cavity.

3. The arrangement according to claim 1, wherein the at least one lubricant line opens into a second cavity which surrounds the planet carrier.

4. The arrangement according to claim 1, wherein each of the at least one recess of the planet carrier forms a plateau in a center thereof.

5. The arrangement according to claim 4, wherein the plateau projects out of the recess.

6. The arrangement according to claim 4, wherein the oil feedthrough ring is configured to be bolted to the plateau.

* * * * *